United States Patent
Mutsuda et al.

(10) Patent No.: US 9,382,414 B2
(45) Date of Patent: Jul. 5, 2016

(54) FLAME RETARDANT THERMOPLASTIC RESIN COMPOSITION

(71) Applicants: Daicel-Evonik Ltd., Tokyo (JP); Daikin Industries, Ltd., Osaka-shi, Osaka (JP)

(72) Inventors: Mitsuteru Mutsuda, Himeji (JP); Tatsuki Akashi, Himeji (JP); Yuki Adachi, Settsu (JP); Haruhisa Masuda, Settsu (JP)

(73) Assignee: DAICEL-EVONIK LTD., Tokyo (JP)

( * ) Notice: Subject to any disclaimer, the term of this patent is extended or adjusted under 35 U.S.C. 154(b) by 0 days.

(21) Appl. No.: 14/424,886

(22) PCT Filed: Aug. 21, 2013

(86) PCT No.: PCT/JP2013/072295
§ 371 (c)(1),
(2) Date: Feb. 27, 2015

(87) PCT Pub. No.: WO2014/034493
PCT Pub. Date: Mar. 6, 2014

(65) Prior Publication Data
US 2015/0259525 A1    Sep. 17, 2015

(30) Foreign Application Priority Data

Aug. 31, 2012 (JP) .................................. 2012-191084

(51) Int. Cl.
| | | |
|---|---|---|
| C08L 61/00 | (2006.01) | |
| C08L 61/16 | (2006.01) | |
| B29C 69/00 | (2006.01) | |
| C08L 71/00 | (2006.01) | |
| B29L 31/00 | (2006.01) | |

(52) U.S. Cl.
CPC ................. *C08L 61/16* (2013.01); *B29C 69/00* (2013.01); *C08L 71/00* (2013.01); *B29L 2031/772* (2013.01); *C08G 2650/40* (2013.01); *C08L 2201/02* (2013.01); *C08L 2207/04* (2013.01)

(58) Field of Classification Search
CPC ..... C08L 71/00; C08L 61/16; C08L 2207/04; C08L 2201/02; B29C 69/00; B29C 2031/772
See application file for complete search history.

(56) References Cited

U.S. PATENT DOCUMENTS

| | | |
|---|---|---|
| 2004/0053061 A1 | 3/2004 | Yonezawa et al. |
| 2014/0329087 A1 | 11/2014 | Masuda et al. |
| 2014/0336333 A1 | 11/2014 | Xie et al. |

FOREIGN PATENT DOCUMENTS

| | | |
|---|---|---|
| JP | 2003-26939 A | 1/2003 |
| JP | 2003-82123 A | 3/2003 |
| JP | 2006-231761 A | 9/2006 |
| JP | 2006-274073 A | 10/2006 |
| JP | 2008-169363 A | 7/2008 |
| JP | 2010-135280 A | 6/2010 |
| WO | WO 2012/005133 A1 | 1/2012 |
| WO | WO 2013/088968 A1 | 6/2013 |

OTHER PUBLICATIONS

International Search Report, issued in PCT/JP2013/072295, dated Jan. 7, 2014.

*Primary Examiner* — Nathan M Nutter
(74) *Attorney, Agent, or Firm* — Birch, Stewart, Kolasch & Birch, LLP

(57) ABSTRACT

A thermoplastic resin composition having a high flame retardancy in a thin-wall molded product and a molded article thereof are provided. The thermoplastic resin composition comprises (A) a thermoplastic resin containing a repeating unit having an arylene group, an ether group, and a carbonyl group and (B) a thermoplastic fluorine-containing resin. The weight ratio of the thermoplastic resin (A) and the thermoplastic fluorine-containing resin (B) in the former/the latter is 80/20 to 99/1. The thermoplastic fluorine-containing resin (B) is dispersed in the form of a particle in the thermoplastic resin (A) to form a dispersed phase, and the dispersed phase has an average particle diameter of not more than 3 μm. The thermoplastic resin composition is suitable for forming a molded article having a thin-wall portion with a thickness of not more than 1.5 mm.

10 Claims, No Drawings

FLAME RETARDANT THERMOPLASTIC RESIN COMPOSITION

TECHNICAL FIELD

The present invention relates to a thermoplastic resin composition (for example, an aromatic polyetherketone-series resin composition) having a high flame retardancy even in a thin-wall molded article and a molded article of the composition.

BACKGROUND ART

Thin-wall molded products to be used in the light electric appliance field or other fields require high flame retardancy in addition to thermal or heat resistance due to soldering, stiffness, and mechanical strength for impact or stress. An aromatic polyetherketone resin, such as a polyetheretherketone (PEEK), is known as a super engineering plastic having excellent heat resistance and mechanical properties. Although the aromatic polyetherketone resin is a material having a high oxygen index and a high flame retardancy, the resin is not absolutely unburnable. A thin-wall molded product of the resin, which is violently oxidized and decomposed by burning, has still insufficient flame retardancy.

WO2012/005133 (Patent Document 1) discloses a resin composition for improvement of sliding properties and impact resistance, wherein the resin composition comprises an aromatic polyetherketone resin and a fluorine-containing resin, the fluorine-containing resin is a copolymer of tetrafluoroethylene and a perfluoroethylenically unsaturated compound, the mass ratio of the aromatic polyetherketone resin and the fluorine-containing resin is 95:5 to 50:50, the fluorine-containing resin is dispersed as particles in the aromatic polyetherketone resin and has an average dispersed particle diameter of not more than 3 μm. The Examples of the document disclose an embodiment in which the aromatic polyetherketone resin and the fluorine-containing resin were used in a mass ratio of 80:20 to 60:40 to prepare a molded article having a thickness of 3 mm.

Japanese Patent Application Laid-Open Publication No. 2006-274073 (JP-2006-274073A, Patent Document 2) discloses a resin composition for improvement of external appearance, slipping properties, solvent resistance, and heat resistance in a thin molded article (such as a film), wherein the resin composition comprises 70 to 99% by mass of a polyarylketone resin (e.g., a polyetheretherketone) and 30 to 1% by mass of a micro-powdery fluorine-containing resin, the fluorine-containing resin is dispersed in the resin composition and has an average particle diameter of 0.1 to 30 μm. This document discloses that a polytetrafluoroethylene (PTFE) is particularly preferred. In Examples of the document, a PTFE was used in an amount of 10 to 20% by weight.

Unfortunately, these documents fail to disclose the flame retardancy of these resin compositions.

RELATED ART DOCUMENTS

Patent Documents

Patent Document 1: WO2012/005133 (Claims, Examples)
Patent Document 2: JP-2006-274073A (Claims, paragraphs [0005] [0014], Examples)

SUMMARY OF THE INVENTION

Problems to be Solved by the Invention

It is therefore an object of the present invention to provide a thermoplastic resin composition having a high flame retardancy even in a thin-wall molded article and a molded article of the composition.

Another object of the present invention is to provide a thermoplastic resin composition having excellent flexural elasticity and noncorrosiveness to metal, and a molded article of the composition.

It is still another object of the present invention to provide a thermoplastic resin composition providing excellent mold-releasability and surface properties (or surface smoothness) of a molded product, and a molded article of the composition.

Means to Solve the Problems

In order to achieve the above objects, the inventors of the present application firstly subjected a molded product formed from an aromatic polyetherketone resin to a burning test in accordance with Underweiter's Laboratories, Inc., Subject 94 (UL94) and observed the burning behavior in detail. The thin-wall molded product formed from the aromatic polyetherketone resin had a relatively short burning time at a first controlled-flame application, and a nonuniform char layer appeared on the surface of the molded product. Since the molded product had a considerably increased internal temperature by the first controlled-flame application, the resin inside the molded product was decomposed into gas at a second controlled-flame application. The gas flowed out from a weak portion of the ununiform char layer or a non-char portion and was allowed to react with atmospheric oxygen to burn. It was found that the molded product lacked flame retardancy probably due to the burning behavior.

In order to improve the flame retardancy in a commonly-used resin, a variety of flame retardants (e.g., a bromine-containing flame retardant and a phosphorus-containing flame retardant) has been added to the resin. Unfortunately, for the aromatic polyetherketone resin, the addition of the flame retardant to the resin cannot improve the flame retardancy, because the flame retardant is decomposed during melt-kneading due to a high process temperature (for example, a melting temperature).

In order to prevent the spreading of a fire resulting from the dripping of a burning resin, the flame retardant can be used in combination with a dripping inhibitor. Unfortunately, the dripping inhibitor does not express the effect until the dripping inhibitor is used in combination with the flame retardant. Moreover, as described above, since it is practically impossible to add the flame retardant to the aromatic polyetherketone resin, there has been no conception that the dripping inhibitor alone is added to the aromatic polyetherketone resin.

Incidentally, the inventors of the present application dared to add a polytetrafluoroethylene (PTFE) alone as a dripping inhibitor to the aromatic polyetherketone resin. Unfortunately, the flame retardancy of the resulting molded product could not be improved because the molded product probably had a large surface roughness due to the dispersed PTFE having a coarse fibril form in the resin and formed an ununiform char layer by a first controlled-flame application.

The inventors of the present application made further intensive studies and finally found that the addition of a small amount of a melt-moldable thermoplastic fluorine-containing resin to a thermoplastic resin (an aromatic polyetherketone resin) containing a repeating unit having an arylene group, an ether group, and a carbonyl group imparts a high flame retardancy to a thin-wall molded article of the composition probably because a uniform char layer can be formed by a first controlled-flame application due to a fine size of the thermoplastic fluorine-containing resin dispersed in the above thermoplastic resin (or a finely dispersed phase in the above thermoplastic resin). The present invention was accomplished based on the above findings.

That is, an aspect of the present invention provides a flame-retardant thermoplastic resin composition which is suitable for forming a molded article having a thin-wall portion having a thickness of not more than 1.5 mm. The flame-retardant thermoplastic resin composition comprises (A) a thermoplastic resin containing a repeating unit having an arylene group, an ether group, and a carbonyl group and (B) a thermoplastic fluorine-containing resin. The weight ratio of the thermoplastic resin (A) and the thermoplastic fluorine-containing resin (B) is 80/20 to 99/1 (for example, 95/5 to 99/1, preferably 96/4 to 98/2) in the former/the latter. The thermoplastic fluorine-containing resin (B) is dispersed in a form of a particle in the thermoplastic resin (A) to form a dispersed phase. The dispersed phase (thermoplastic fluorine-containing resin (B) phase) may have an average particle diameter of not more than 3 μm (for example, about 0.1 to 0.7 μm) and preferably not more than 0.6 μm.

The thermoplastic resin (A) may comprise a thermoplastic resin containing a repeating unit represented by any one of the following formulae (a1) to (a3):

  (a1)

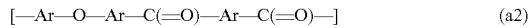  (a2)

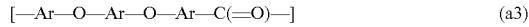  (a3)

wherein Ar represents a bivalent aromatic hydrocarbon ring group (such as phenylene group or biphenylene group).

The thermoplastic fluorine-containing resin (B) may be a copolymer of a radical-polymerizable perfluoro-series monomer, for example, a copolymer of tetrafluoroethylene and at least one member selected from the group consisting of hexafluoropropylene and a perfluoro($C_{1-3}$alkyl vinyl ether). The melt viscosity ratio of the thermoplastic resin (A) and the thermoplastic fluorine-containing resin (B) may be 0.3/1 to 6/1 in the former/the latter at a temperature of 390° C. and a shear rate of 60 $s^{-1}$.

The flame-retardant thermoplastic resin composition has an excellent flame retardancy even in a thin-wall molded article of the composition. The resin composition may have a total burning time of first and second applications (first and second controlled-flame applications) of not longer than 10 seconds when a specimen having a thickness of 0.8 mm is subjected to a vertical burning test in accordance with UL94.

Another aspect of the present invention provides a molded article having a thin-wall portion, which comprises the flame-retardant thermoplastic resin composition. A further aspect of the present invention provides a method for improving a flame retardancy of a thin-wall molded article, wherein the method comprises: melt-kneading the flame-retardant thermoplastic resin composition to disperse the thermoplastic fluorine-containing resin (B) in a particulate form having an average particle diameter of not more than 3 win the thermoplastic resin (A), and molding the melt-kneaded product into a thin-wall molded article having a portion having a thickness of not more than 1.5 mm.

Effects of the Invention

According to the present invention, the thermoplastic fluorine-containing resin is dispersed in finely divided particulate form in a specific aromatic thermoplastic resin to stably show a high flame retardancy even when the composition is molded into a thin-wall article. Moreover, according to the present invention, just an addition of a small amount of the thermoplastic fluorine-containing resin allows significant improvement of the flame retardancy. The resulting composition exhibits a noncorrosiveness to metal, and a molded product of the composition has well-balanced flexural elasticity, mold-releasability, and surface properties (or surface smoothness).

DESCRIPTION OF EMBODIMENTS

The flame-retardant thermoplastic resin composition of the present invention contains (A) a thermoplastic resin having a structure in which a plurality of aromatic rings are coupled through specific linker(s) and (B) a thermoplastic fluorine-containing resin. The resin composition has an extremely high flame retardancy and is suitable for forming a thin-wall molded article.

(A) Thermoplastic Resin

The thermoplastic resin (A) is not particularly limited to a specific one as far as the resin comprises a repeating unit containing an arylene group, an ether group [—O—], and a carbonyl group [—C(=O)—]. For example, the thermoplastic resin (A) contains a repeating unit represented by any one of the following formulae (a1) to (a5):

  (a1)

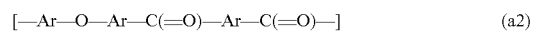  (a2)

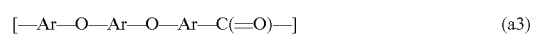  (a3)

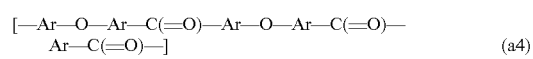  (a4)

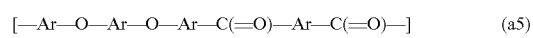  (a5)

wherein Ar represents a bivalent aromatic hydrocarbon ring group which may have a substituent.

The bivalent aromatic hydrocarbon ring group represented by Ar may include, for example, a $C_{6-10}$arylene group [e.g., a phenylene group (such as o-, m-, or p-phenylene group) and a naphthylene group], a bi$C_{6-10}$arylene group [e.g., a biphenylene group (such as 2,2'-biphenylene group, 3,3'-biphenylene group, or 4,4'-biphenylene group)], and a ter$C_{6-10}$arylene group (such as o-, m-, or p-terphenylene group). These aromatic hydrocarbon ring groups may have a substituent; the substituent may include, for example, a halogen atom, an alkyl group (e.g., a straight- or branched-chain $C_{1-4}$alkyl group, such as methyl group), a haloalkyl group, a hydroxyl group, an alkoxy group (e.g., a straight- or branched-chain $C_{1-4}$alkoxy group, such as methoxy group), a mercapto group, an alkylthio group, a carboxyl group, a sulfo group, an amino group, an N-substituted amino group, and a cyano group. In the repeating units (a1) to (a5), the species of each Ar may be the same or different from each other.

A preferred Ar may include a phenylene group (e.g., p-phenylene group) and a biphenylene group (e.g., 4,4'-biphenylene group).

As a resin having the repeating unit (a1), there may be mentioned a polyetherketone (for example, "PEEK-HT" manufactured by Victrex), and others. A resin having the repeating unit (a2) may include a polyetherketoneketone (for example, "PEKK" manufactured by Arkema+Oxford Performance Material), and others. As a resin having the repeating unit (a3), there may be mentioned a polyetheretherketone (for example, "VICTREX PEEK" manufactured by Victrex, "Vestakeep (registered trademark)" manufactured by Evonik, "Vestakeep-J" manufactured by Daicel-Evonik Ltd., "Ketaspire (registered trademark)" manufactured by Solvay Advanced Polymers), a polyether-diphenyl-ether-phenyl-ketone-phenyl (for example, "Kadel (registered trademark)" manufactured by Solvay Advanced Polymers), and others. A resin having the repeating unit (a4) may include a polyetherketoneetherketoneketone (for example, "VICTREX ST" manufacturedbyVictrex), and others. As a resin having the repeating unit (a5), there may be mentioned a polyetheretherketoneketone, and others.

In the repeating unit containing an arylene group, an ether group, and a carbonyl group, the ratio of the ether segment (E) and the ketone segment (K) in the former/the latter (E/K) is about 0.5/1 to 2/1 and preferably about 1/1 to 2/1. The ether segment imparts flexibility to the molecular chain and the ketone segment imparts stiffness to the molecular chain; thus a larger amount of the ether segment increases the crystallization rate and the ultimately reachable degree of crystallization, and a larger amount of the ketone segment tends to raise the glass transition temperature and the melting point.

These thermoplastic resins (A) may be used alone or in combination. Among these thermoplastic resins (A), a preferred resin includes an aromatic polyetherketone resin having any one of the repeating units (a1) to (a3), in particular, an aromatic polyetherketone resin (for example, a polyetheretherketone) having the repeating unit (a3) in view of excellent properties in a high glass transition temperature and melting point, and an increased crystallization rate.

The number average molecular weight of the thermoplastic resin (A) is not particularly limited to a specific one as far as the resin is melt-kneadable or moldable (or formable). For example, the thermoplastic resin (A) may have a number average molecular weight of not less than 5,000 (e.g., 5,000 to 1,000,000), preferably not less than 8,000 (e.g., 10,000 to 500,000), and more preferably not less than 15,000 (e.g., 20,000 to 100,000) in terms of polystyrene in a gel permeation chromatography (GPC).

The thermoplastic resin (A) may have a glass transition temperature (Tg) of, for example, not lower than 100° C., preferably about 120 to 200° C., and more preferably about 140 to 180° C., in view of heat resistance or others. Moreover, the thermoplastic resin (A) may have a melting point of, for example, not lower than 300° C., preferably about 310 to 400° C., and more preferably about 320 to 380° C., in view of heat resistance or others. The glass transition temperature and the melting point can be measured by a differential scanning thermal analysis (DSC).

Assuming that the thermoplastic resin (A) has a melt viscosity "Va" at a temperature of 400° C. (or a temperature of 390° C.) and a shear rate of 60 $s^1$, the melt viscosity "Va" may be, for example, about 50 to 4000 Pa·s, preferably about 100 to 3000 Pa·s, more preferably about 150 to 2500 Pa·s, and particularly about 200 to 2000 Pa·s. In a case where the melt viscosity is too low, the thermoplastic fluorine-containing resin (B) cannot stably be dispersed in a particulate form. In a case where the melt viscosity is too high, the composition requires a large quantity of heat in compounding process (for example, melt-kneading process). The melt viscosity can be measured using a conventional apparatus, for example, a capillary rheometer.

The thermoplastic resin (A) may be synthesized by a conventional method, for example, a nucleophilic substitution reaction (such as condensation of an aromatic diol component and an aromatic dihalide component or self-condensation of an aromatic monohalide-monool component).

The aromatic diol component may include a dihydroxybenzene (such as hydroquinone), a dihydroxybenzophenone (such as 4,4'-dihydroxybenzophenone), and others. As the aromatic dihalide component, there may be mentioned a dihalobenzophenone (such as 4,4'-difluorobenzophenone or 4,4'-dichlorobenzophenone), and others. The aromatic monohalide-monool component may include a halohydroxybenzophenone (such as 4-fluoro-4'-hydroxybenzophenone), and others.

The condensation reaction may be carried out in the presence of a base and/or a solvent. Examples of the base may include an alkali metal salt, for example, an alkali metal carbonate, such as potassium carbonate (anhydrous). The solvent may include a high-boiling solvent, for example, diphenylsulfone and sulfolane. The reaction temperature may be, for example, about 150 to 400° C. and preferably about 200 to 350° C.

The reaction product may be separated and purified by a conventional separation means, for example, filtration, concentration, crystallization, and chromatography. The reaction product may optionally be washed and dried. As a washing solvent, there may be mentioned water, alcohols (such as methanol or ethanol), ketones (such as acetone), and a mixed solvent thereof. A solid reaction product may be pulverized and/or classified for controlling the particle size.

In order to regulate the crystallization temperature or others, a terminal group (such as a halogen atom) of the reaction product may be modified with, for example, an alkali metal sulfonate group (such as lithium sulfonate group, sodium sulfonate group, or potassium sulfonate group).

(B) Thermoplastic Fluorine-Containing Resin

The thermoplastic fluorine-containing resin (B) is generally used in order to prevent falling (dripping) of fire and melting liquid. According to the present invention, surprisingly, combination use of the thermoplastic resin (A) and a small amount of the thermoplastic fluorine-containing resin (B) significantly improves the flame retardancy.

The thermoplastic fluorine-containing resin (B) is not particularly limited to a specific one as far as the resin is melt-formable (melt-moldable). For example, as the thermoplastic fluorine-containing resin (B), there may be mentioned a homo- or co-polymer of a radical-polymerizable fluorine-containing monomer. However, a tetrafluoroethylene homopolymer (PTFE), which is not melt-moldable, is not included in the thermoplastic fluorine-containing resin (B). The radical-polymerizable fluorine-containing monomer may include, for example, a fluorine-containing olefinic monomer (e.g., a mono- to per-fluoro$C_{2-4}$olefin, such as vinyl fluoride, vinylidene fluoride, chlorotrifluoroethylene, tetrafluoroethylene, or hexafluoropropylene), a fluorine-containing vinyl ether-series monomer [e.g., a mono- to per-fluoro($C_{1-5}$alkyl vinyl ether), such as perfluoro(methyl vinyl ether), perfluoro(ethyl vinyl ether), or perfluoro(propyl vinyl ether)], and a fluorine-containing dioxole-series monomer (e.g., 2,2-bis(trifluoromethyl)-4,5-difluoro-1,3-dioxole). These radical-polymerizable fluorine-containing monomers may be used alone or in combination. Among these radical-polymerizable fluorine-containing monomers, a preferred monomer includes a radical-polymerizable perfluoro-series monomer, for example, a perfluoroolefinic monomer (e.g., a perfluoro$C_{2-3}$olefin, such as tetrafluoroethylene) and a perfluorovinylether-series monomer (e.g., a perfluoro($C_{1-4}$alkyl vinyl ether), such as perfluoro(propyl vinyl ether)). In particular, the preferred radical-polymerizable fluorine-containing monomer contains at least a perfluoro$C_{2-3}$olefin (such as tetrafluoroethylene).

As a copolymerizable monomer, there may be mentioned a radical-polymerizable monomer corresponding to the above radical-polymerizable fluorine-containing monomer and being free from a fluorine atom, for example, a fluorine-free olefinic monomer (e.g., a $C_{2-4}$olefin, such as ethylene or propylene; and a $C_{2-4}$olefin bromide). The ratio of the copolymerizable monomer relative to 100 parts by weight of the radical-polymerizable fluorine-containing monomer may be about not more than 30 parts by weight, preferably about not more than 20 parts by weight, and more preferably about not more than 10 parts by weight (for example, about 0.01 to 1 part by weight).

Representative examples of the thermoplastic fluorine-containing resin (B) may include a copolymer of a radical-polymerizable perfluoro-series monomer (such as tetrafluoroethylene) and another copolymerizable monomer, for example, a copolymer of tetrafluoroethylene and another radical-polymerizable perfluoro-series monomer (such as hexafluoropropylene or a perfluoro ($C_{1-3}$alkyl vinyl ether)). The copolymer includes, for example, a tetrafluoroethylene-hexafluoropropylene copolymer, a tetrafluoroethylene-perfluoro (propyl vinyl ether) copolymer, and a tetrafluoroethylene-hexafluoropropylene-perfluoro (propyl vinyl ether) copolymer. The ratio (weight ratio) of tetrafluoroethylene and the copolymerizable monomer (such as another radical-polymerizable perfluoro-series monomer) in the former/the latter may be about 80/20 to 99/1, preferably about 85/15 to 99/1, more preferably about 90/10 to 99/1 (e.g., about 93/7 to 99/1), and usually about 80/20 to 98/2 (e.g., 85/15 to 95/5). An excessively high ratio of tetrafluoroethylene or an excessively high ratio of the copolymerizable monomer makes it difficult to disperse the thermoplastic fluorine-containing resin (B) in the form of a fine particle, and the resulting composition may have a low flame retardancy.

These thermoplastic fluorine-containing resins (B) may be used alone or in combination. Among these thermoplastic fluorine-containing resins (B), a tetrafluoroethylene-hexafluoropropylene-series copolymer is preferred in the respect that the copolymer is dispersed in the thermoplastic resin (A) to decrease in both average particle diameter and maximum particle diameter and allows great improvement of flame retardancy.

The thermoplastic fluorine-containing resin (B) may be subjected to a surface treatment (for example, a plasma treatment, a fluorine gas treatment, and an ammonia treatment).

The melting point of the thermoplastic fluorine-containing resin (B) is not particularly limited to a specific one. In view of moldability, the thermoplastic fluorine-containing resin (B) preferably melts at a temperature of not higher than the melting temperature of the thermoplastic resin (A). For example, the thermoplastic fluorine-containing resin (B) may have a melting point of about not higher than 400° C. (e.g., about 200 to 380° C.) and preferably about 230 to 350° C. (e.g., about 250 to 300° C.).

Assuming that the thermoplastic fluorine-containing resin (B) has a melt viscosity "Vb" at a temperature of 390° C. and a shear rate of 60 $s^1$, the melt viscosity ratio (Va/Vb) of the thermoplastic resin (A) relative to the thermoplastic fluorine-containing resin (B) is, for example, about 0.05/1 to 10/1, preferably about 0.1/1 to 8/1, more preferably about 0.2/1 to 7/1, and particularly about 0.3/1 to 6/1 (e.g., about 0.3/1 to 5/1).

According to the present invention, even in a case where the amount (to be used) of the thermoplastic fluorine-containing resin (B) is small, the resin composition shows a high flame retardancy. In particular, even in a thin-wall molded product, the composition shows a high flame retardancy. The ratio (weight ratio) of the thermoplastic resin (A) and the thermoplastic fluorine-containing resin (B) in the former/the latter may be selected from the range of 80/20 to 99/1 (for example, 85/15 to 99/1). An excessively large amount of the thermoplastic fluorine-containing resin (B) may reduce the flexural modulus or induce the metal corrosiveness by possible generation of hydrofluoric acid in injection molding or others.

Considering a balance among the flame retardancy, the flexural elasticity, the noncorrosiveness to metal, and others, the ratio (weight ratio) of the thermoplastic resin (A) relative to the thermoplastic fluorine-containing resin (B) may be, for example, about 90/10 to 99/1, preferably about 92/8 to 99/1, more preferably about 95/5 to 99/1 (e.g., about 95.5/4.5 to 99/1) or may be about 96/4 to 98.5/1.5 (e.g., about 96/4 to 98/2). The ratio of the thermoplastic fluorine-containing resin (B) relative to 100 parts by weight of the thermoplastic resin (A) may be about 1 to 5 parts by weight (for example, about 1.5 to 4.5 parts by weight).

The thermoplastic resin composition may contain another resin and/or additive as far as the resin and/or additive does not inhibit the effects of the present invention. The resin may include, for example, a polyarylate, a poly(phenylene ether), a modified poly(phenylene ether) (such as a polyethernitrile), a poly(phenylene sulfide), a polysulfone, a polyethersulfone, a poly(ketone sulfide), a polybenzimidazole, a polyetherimide, and a polyamideimide. The additive may include, for example, a stabilizer (such as a heat stabilizer or a light stabilizer), a filler [an inorganic filler, for example, a glass fiber, a glass powder, a carbon fiber, a carbon powder, a carbon nanotube, a metal oxide (such as aluminum oxide or zinc oxide), and a metal nitride (such as aluminum nitride or boron nitride)], a plasticizer, a lubricant, and a coloring agent. These resins may be used alone or in combination; these additives may be used alone or in combination. According to the present invention, even in a case where the filler is not added to the resin composition, the resin composition can stably provide a high flame retardancy, reduce an adverse effect of weld on the tensile strength, and improve in a moldability.

The thermoplastic resin composition may have a melt viscosity at a temperature of 400° C. (or a temperature of 390° C.) and a shear rate of 60 $s^{-1}$ of, for example, about 50 to 4000 Pa·s, preferably about 100 to 3000 Pa·s, and more preferably about 150 to 2500 Pa·s.

(Phase-Separation Structure)

The thermoplastic resin composition has a phase-separation structure, in which the thermoplastic fluorine-containing resin (B), constituting a dispersed phase, is dispersed in the form of a particle in a continuous phase containing the thermoplastic resin (A). The dispersed phase may have an isotropic form or an anisotropic form.

The dispersed phase (the thermoplastic fluorine-containing resin (B) phase) may have an average particle diameter of, for example, not more than 3 μm (e.g., not more than 2 μm), preferably not more than 1 μm (e.g., about 0.1 to 0.7 μm), more preferably not more than 0.6 μm (e g, about 0.2 to 0.6 μm) or may have an average diameter of about 0.05 to 0.8 μm. Moreover, the dispersed phase (the thermoplastic fluorine-containing resin (B) phase) may have an average particle diameter of not more than 0.7 μm, for example, not more than 0.5 μm (e.g., about 0.01 to 0.5 μm), preferably not more than 0.4 μm, and more preferably not more than 0.3 μm. The dispersed phase may have a maximum particle diameter of, for example, not more than 4 μm, preferably not more than 3 μM (e.g., not more than 2 μm), and more preferably not more than 1 μm (e.g., not more than 0.8 μm). According to the present invention, since the dispersed phase can be made into a fine particle to be uniformly dispersed in the continuous phase, the resin composition can stably show a high flame retardancy. The particle diameter of the dispersed phase can be measured by observing a sheet formed from the thermoplastic resin composition with a conventional apparatus [such as a transmission electron microscope (TEM), a scanning electron microscope (SEM), a laser microscope, or an atomic force microscope (AFM)] and binarizing the resulting image with an optically analyzing apparatus.

The thermoplastic resin composition has an excellent flexural elasticity. The flexural modulus may be, for example, about 3000 to 5000 MPa, preferably about 3100 to 4500 MPa, and more preferably about 3200 to 4000 MPa in accordance with ASTM D790.

The thermoplastic resin composition (or a molded article thereof) has an excellent flame retardancy even in a thin-wall molded article. When a specimen having a thickness of 0.8 mm is subjected to a vertical burning test in accordance with UL94, the total burning time of first and second controlled-flame applications may be not longer than 15 seconds, preferably not longer than 12 seconds, and more preferably not longer than 10 seconds (for example, not longer than 8 seconds).

Further, the thermoplastic resin composition exhibits an excellent noncorrosiveness to metal and can effectively prevent a resin-processing apparatus (such as an injection molding machine or a metal mold of the machine, or an extruder) from corroding.

The process for producing the thermoplastic resin composition is not particularly limited to a specific one as far as the thermoplastic fluorine-containing resin (B) can be dispersed in the form of a finely divided particle in the thermoplastic resin (A). The thermoplastic resin composition can usually be prepared by melt-kneading these components. More specifically, in practical cases these components are optionally pre-mixed by a mixer (such as a tumbling machine, a V-shaped blender, a Henschel mixer, a nauta mixer, a ribbon mixer, a mechanochemical apparatus, or an extrusion blender) and then melt-kneaded by a variety of melt-kneaders (for example, a kneader, and a uniaxial or biaxial extruder). The melt-kneading allows the formation of a dispersed phase composed of the thermoplastic fluorine-containing resin (B), which is dispersed in the form of a particle having a predetermined average particle diameter in the thermoplastic resin (A). It is sufficient that the melt-kneading temperature is not lower than the melting point of the thermoplastic resin (A) and that of the thermoplastic fluorine-containing resin (B). For example, the melt-kneading temperature may be, for example, about 300 to 450° C. and preferably about 350 to 400° C. The kneading speed (rotational speed) may for example be about 150 to 500 rpm and preferably about 200 to 400 rpm (e.g., about 250 to 350 rpm). The melt-kneaded product may be pelletized by a conventional pelletization means (such as a pelletizing machine).

The molded article of the present invention is not particularly limited to a specific one as far as the molded article is formed from the above-mentioned thermoplastic resin composition. For example, the molded article may have a two-dimensional form or shape (such as a film form or a sheet form) or may be a three-dimensional form or shape (such as a rod form, a pipe form, or a board form).

According to the present invention, even in a thin-wall molded article, an extremely high flame retardancy can be accomplished. The thin-wall molded article may representatively include a molded article (e.g., a thin-wall sheet) having a thin-wall portion having a thickness of not more than 1.5 mm, preferably not more than 1.4 mm, and more preferably not more than 1 mm (e.g., about 0.1 to 1 mm). The thin-wall portion may have a thickness of about 0.3 to 1.3 mm, preferably about 0.5 to 1.2 mm, and more preferably about 0.7 to 1 mm.

The molded article is formed by a conventional manner (for example, extrusion molding, injection molding, and press molding). In injection molding, the cylinder temperature may be selected from a range equivalent to the range of the melt-kneading temperature. The metal-mold temperature may be, for example, about 80 to 250° C., preferably about 90 to 220° C., and more preferably about 100 to 200° C. According to the present invention, the molding cycle can be shortened due to an excellent mold-releasability.

EXAMPLES

The following examples are intended to describe this invention in further detail and should by no means be interpreted as defining the scope of the invention. With respect to flame-retardant resin compositions of Comparative Example and Examples, raw materials and evaluation methods of each physical property are as follows.

[Raw Material]

PEEK: Vestakeep-J ZV7403 manufactured by Daicel-Evonik Ltd., a polyetheretherketone FEP: a tetrafluoroethylene-hexafluoropropylene-series copolymer (composition weight ratio; tetrafluoroethylene/hexafluoropropylene/perfluoro (propyl vinyl ether)=87.5/11.5/1.0, MFR; 27 g/10 minutes)

PFA: a tetrafluoroethylene-perfluoro (alkyl vinyl ether)-series copolymer (composition weight ratio; tetrafluoroethylene/perfluoro(propyl vinyl ether)=94.5/5.5, MFR; 23 g/10 minutes)

[Flexural Modulus]

The flexural modulus was measured in accordance with ASTM D790.

[Average Particle Diameter of Dispersed Phase]

For each resin composition of Comparative Example and Examples, the average particle diameter of the dispersed phase was determined as follows. A press sheet formed from a resin composition was fixed on a sample holder of an ultramicrotome (ULTRACUT S, manufactured by Leica). The inside of the chamber was cooled to −80° C. with liquid nitrogen, and a thin piece having a thickness of 90 nm was cut from the press sheet. The resulting thin piece was collected by a platinum ring to which a 20% ethanol solution was attached, and was made to adhere to a copper sheet mesh (200A, manufactured by Okenshoji Co., Ltd.). The thin piece adhering to the copper sheet mesh was observed with a transmission electron microscope (H7100FA, manufactured by Hitachi, Ltd.) and filmed on a negative film. The negative film was scanned by a scanner (GT-9400UF, manufactured by EPSON (Seiko Epson Corp.)) to give an electronic image. The resulting electronic image was binarized by an optically analyzing apparatus (LUZEX AP, manufactured by Nireco Corporation) to calculate the average particle diameter of the dispersed phase.

[Vertical Burning Test]

For each injection-molded product formed from each resin composition of Comparative Example and Examples, the vertical burning test was carried out in accordance with UL94V.

[Metal Corrosion Test]

For each resin composition of Comparative Example and Examples, the metal corrosion test was carried out as follows. A metal disk (diameter: 50 mm, thickness: 2 mm) made of a stainless steel (SUS316) was attached (or adhered) on a central area of a petri dish to give a metal sample. Two metal samples were prepared. A pellet having a size of 1 cm³ was formed from a resin composition and was interposed between the metal disks facing each other to give a test sample. The resulting test sample was heated in an oven at 390° C. for 42 hours, and the metal corrosion was evaluated on the basis of the following criteria.

4 . . . No discoloration or unevenness in the contact area with the pellet.

3 . . . Local discoloration in the contact area with the pellet, although no unevenness in the contact area.

2 . . . Local discoloration and unevenness in the contact area with the pellet.

1 . . . Discoloration and unevenness in the whole contact area with the pellet.

[Metal-Mold Releasability]

The specimen (0.8 mm thick) for the vertical burning test was molded, the metal mold was opened, and the specimen was ejected by an ejector pin. If the specimen remained in the moving side or the running side, the releasability of the specimen was graded "bad releasability"; if the specimen was entirely ejected, the releasability of the specimen was graded "good releasability". The metal-mold releasability was evaluated based on the number of "bad releasability" in ten (10) measurements.

Comparative Example 1 and Examples 1 to 17

PEEK and FEP, or PEEK and PFA were dry-blended in the ratio (weight ratio) shown in Tables 3 to 5 using TEX44αII (manufactured by JSW), and then melt-kneaded under the conditions shown in Tables 1 to 2 to prepare resin compositions. For each of the resulting resin compositions, the resin composition was pelletized by a pelletizing machine to give a pellet. Moreover, the resin composition was pressed under the conditions of 380° C. and 5 MPa by a heat-pressing machine to prepare a press sheet having a thickness of 1.4 mm. Further, the resin composition was injection-molded to give an injection-molded product of a thickness of 0.8 mm. The results are shown in Tables 3 to 5.

TABLE 1

| | Examples No. | | | | | | | | |
|---|---|---|---|---|---|---|---|---|---|
| | 1 | 2 | 3 | 4 | 5 | 6 | 7 | 8 | 9 |
| Extrusion temperature (° C.) | | | | | 370 | | | | |
| Rotational speed (rpm) | | | | | 300 | | | | |
| Average particle diameter (μm) | 0.4 | 0.4 | 0.5 | 0.6 | 0.2 | 0.3 | 0.2 | 0.5 | 0.5 |

TABLE 2

| | Examples No. | | | | | | | |
|---|---|---|---|---|---|---|---|---|
| | 10 | 11 | 12 | 13 | 14 | 15 | 16 | 17 |
| Extrusion temperature (° C.) | | | | 370 | | | | |
| Rotational speed (rpm) | 200 | | | | 300 | | | |
| Average particle diameter (μm) | 0.5 | 0.6 | 0.5 | 0.2 | 0.6 | 0.4 | 0.3 | 0.5 |

TABLE 3

| | | Comparative Example | Examples No. | | | | |
|---|---|---|---|---|---|---|---|
| | | 1 | 1 | 2 | 3 | 4 | 5 |
| PEEK | | 100 | 80 | 89 | 90 | 95 | 95 |
| FEP | | — | 20 | 11 | 10 | 5 | 5 |
| PFA | | — | — | — | — | — | — |
| Flexural modulus (MPa) | | 3300 | 2800 | 3050 | 3100 | 3150 | 3150 |
| Average particle diameter (μm) | | — | 0.4 | 0.4 | 0.5 | 0.6 | 0.2 |
| 0.8 mm thick UL94V | First (sec.) | 6 | 0 | 0 | 0 | 6 | 2 |
| | Second (sec.) | 23 | 0 | 0 | 0 | 2 | 3 |
| | Total | 29 | 0 | 0 | 0 | 8 | 5 |
| Metal corrosion test | | 4 | — | 2 | 3 | 4 | 4 |
| Metal-mold releasability | | 6 | 0 | 0 | 0 | 0 | 0 |

TABLE 4

| | Examples No. | | | | | |
|---|---|---|---|---|---|---|
| | 6 | 7 | 8 | 9 | 10 | 11 |
| PEEK | 96 | 97 | 98 | 99 | 80 | 89 |
| FEP | 4 | 3 | 2 | 1 | — | — |
| PFA | — | — | — | — | 20 | 11 |

TABLE 4-continued

| | | Examples No. | | | | | |
|---|---|---|---|---|---|---|---|
| | | 6 | 7 | 8 | 9 | 10 | 11 |
| Flexural modulus (MPa) | | 3200 | 3220 | 3250 | 3280 | 2820 | 3060 |
| Average particle diameter (μm) | | 0.3 | 0.2 | 0.5 | 0.5 | 0.5 | 0.6 |
| 0.8 mm thick UL94V | First (sec.) | 6 | 6 | 4 | 4 | 0 | 0 |
| | Second (sec.) | 0 | 1 | 5 | 6 | 0 | 0 |
| | Total | 6 | 7 | 9 | 10 | 0 | 0 |
| Metal corrosion test | | 4 | 4 | 4 | 4 | 2 | 2 |
| Metal-mold releasability | | 0 | 0 | 0 | 0 | 0 | 0 |

TABLE 5

| | | Examples No. | | | | | |
|---|---|---|---|---|---|---|---|
| | | 12 | 13 | 14 | 15 | 16 | 17 |
| PEEK | | 90 | 95 | 96 | 97 | 98 | 99 |
| FEP | | — | — | — | — | — | — |
| PFA | | 10 | 5 | 4 | 3 | 2 | 1 |
| Flexural modulus (MPa) | | 3110 | 3160 | 3220 | 3230 | 3270 | 3280 |
| Average particle diameter (μm) | | 0.5 | 0.2 | 0.6 | 0.4 | 0.3 | 0.5 |
| 0.8 mm thick UL94V | First (sec.) | 0 | 3 | 5 | 7 | 4 | 6 |
| | Second (sec.) | 0 | 2 | 1 | 1 | 4 | 4 |
| | Total | 0 | 5 | 6 | 8 | 8 | 10 |
| Metal corrosion test | | 3 | 4 | 4 | 4 | 4 | 4 |
| Metal-mold releasability | | 0 | 0 | 0 | 0 | 0 | 0 |

As apparent from Tables 3 to 5, Examples have excellent flame retardancy, high flexural modulus, excellent noncorrosiveness to metal, and excellent metal-mold releasability, compared with Comparative Example.

INDUSTRIAL APPLICABILITY

The thermoplastic resin composition of the present invention and the molded article thereof have a high flame retardancy even in a thin-wall molded product, and are suitable for components or members for electrical home appliances, office automation (OA) equipment, and mobile devices. Moreover, due to high flexural modulus and cracking resistance even in a thin-wall product, the thermoplastic resin composition of the present invention and the molded article thereof are suitable for thin switches of smart phones, personal computers (such as laptop computers or tablet computers), electronic book readers, digital cameras, and others. Further, the thermoplastic resin composition of the present invention and the molded article thereof are also preferably used for gaskets (e.g., a gasket to be used in the light electric field), binging bands (e.g., a binding band (or a cable tie) usable in an airplane), and others.

The invention claimed is:

1. A flame-retardant thermoplastic resin composition which forms a molded article having a thin-wall portion having a thickness of not more than 1.5 mm,
wherein the composition comprises: (A) a thermoplastic resin containing a repeating unit having an arylene group, an ether group, and a carbonyl group and (B) a thermoplastic fluorine-containing resin, the thermoplastic fluorine-containing resin (B) comprising a copolymer of tetrafluoroethylene and at least one member selected from the group consisting of hexafluoropropylene and a perfluoro($C_{1-3}$alkyl vinyl ether),
a weight ratio of the thermoplastic resin (A) and the thermoplastic fluorine-containing resin (B) in the former/the latter is 95/5 to 99/1,
a melt viscosity ratio of the thermoplastic resin (A) and the thermoplastic fluorine-containing resin (B) in the former/the latter is 0.3/1 to 6/1 at a temperature of 390° C. and a shear rate of 60 $s^{-1}$, and
the thermoplastic fluorine-containing resin (B) is dispersed in the form or particles in the thermoplastic resin (A) to form a dispersed phase, and the dispersed phase has an average particle diameter of not more than 0.7 μm.

2. A flame-retardant thermoplastic resin composition according to claim 1, wherein the weight ratio of the thermoplastic resin (A) and the thermoplastic fluorine-containing resin (B) in the former/the latter is 95.5/4.5 to 99/1.

3. A flame-retardant thermoplastic resin composition according to claim 1, wherein the weight ratio of the thermoplastic resin (A) and the thermoplastic fluorine-containing resin (B) in the former/the latter is 96/4 to 98/2.

4. A flame-retardant thermoplastic resin composition according to claim 1, wherein the dispersed phase of the thermoplastic fluorine-containing resin (B) has an average particle diameter of not more than 0.6 μm.

5. A flame-retardant thermoplastic resin composition according to claim 1, wherein the thermoplastic resin (A) comprises a thermoplastic resin containing a repeating unit represented by any one of the following formulae (a1) to (a3):

[—Ar—O—Ar—C(=O)—]  (a1)

[—Ar—O—Ar—C(=O)—Ar—C(=O)—]  (a2)

[—Ar—O—Ar—O—Ar—C(=O)—]  (a3)

wherein Ar represents a bivalent aromatic hydrocarbon ring group.

6. A flame-retardant thermoplastic resin composition according to claim 1, wherein the thermoplastic fluorine-containing resin (B) comprises at least one member selected from the group consisting of a tetrafluoroethylene-hexafluoropropylene copolymer, a tetrafluoroethylene-perfluoro(propyl vinyl ether) copolymer and a tetrafluoroethylene-hexafluoropropylene-perfluoro(propyl vinyl ether) copolymer.

7. A flame-retardant thermoplastic resin composition according to claim 1, wherein a melt viscosity ratio of the thermoplastic resin (A) and the thermoplastic fluorine-containing resin (B) in the former/the latter is 0.3/1 to 5/1 at a temperature of 390° C. and a shear rate of 60 s$^{-1}$.

8. A flame-retardant thermoplastic resin composition according to claim 1, which has a total burning time of first and second applications of not longer than 10 seconds when a specimen with a thickness of 0.8 mm is subjected to a vertical burning test in accordance with UL94.

9. A molded article having a thin-wall portion comprising a flame-retardant thermoplastic resin composition recited in claim 1.

10. A method for improving a flame retardancy of a molded article, wherein the method comprises:
melt-kneading a flame-retardant thermoplastic resin composition recited in claim 1 to disperse the thermoplastic fluorine-containing resin (B) in a particulate form having an average particle diameter of not more than 0.7 μm in the thermoplastic resin (A), and
molding the melt-kneaded product into a molded article having a thin-wall portion having a thickness of not more than 1.5 mm.

* * * * *